Feb. 11, 1964   J. B. WINTHER   3,121,180
EDDY-CURRENT APPARATUS
Filed March 7, 1962   3 Sheets-Sheet 1

FIG. I.

Jerrold B. Winther,
Inventor.
Koenig, Pope, Senniger and Powers,
Attorneys.

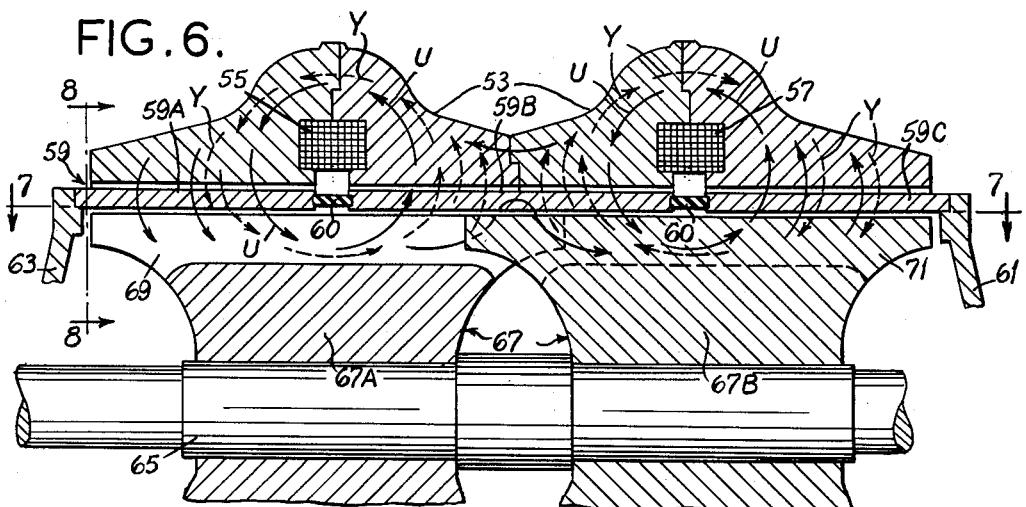
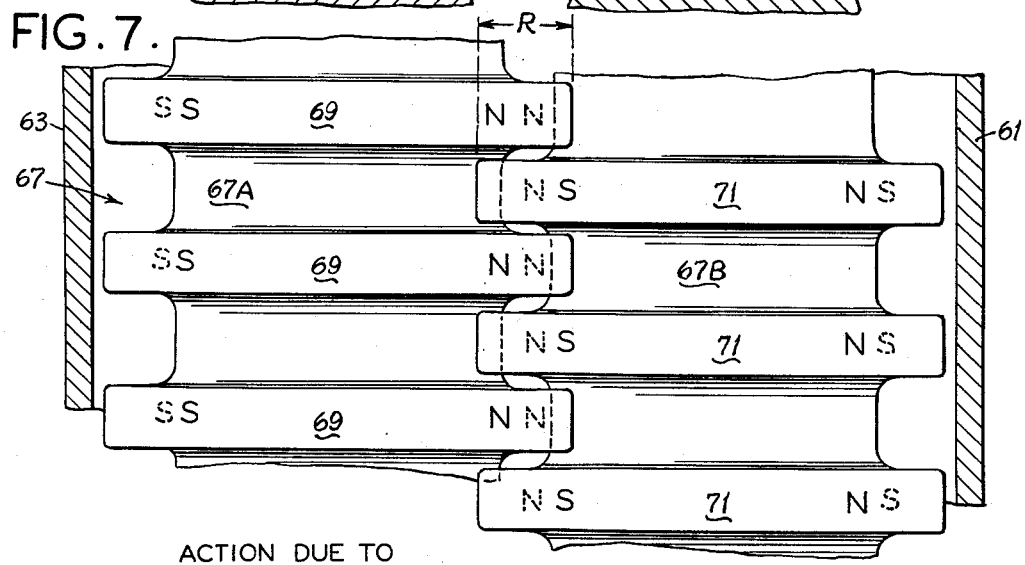
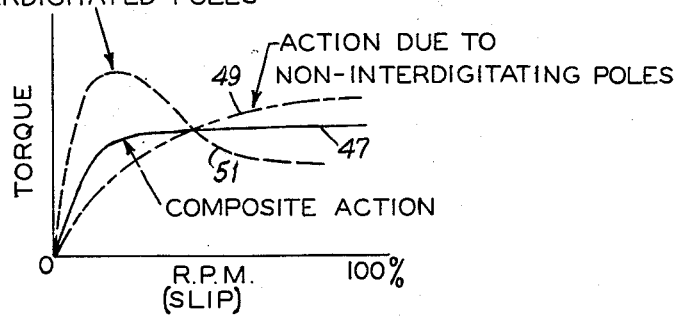

United States Patent Office 3,121,180
Patented Feb. 11, 1964

3,121,180
EDDY-CURRENT APPARATUS
Jerrold B. Winther, Kenosha, Wis., assignor to Eaton Manufacturing Company, Cleveland, Ohio, a corporation of Ohio
Filed Mar. 7, 1962, Ser. No. 178,041
20 Claims. (Cl. 310—105)

This invention relates to eddy-current apparatus, and with regard to certain more specific features, to eddy-current couplings of the so-called double-support type. It is an improvement upon prior structures such as shown in U.S. Patents 2,617,053; 2,648,020; and 2,864,015.

Among the several objects of the invention may be noted the provision of an eddy-current coupling having an improved torque-slip relationship and one adapted better to approach an ideal thermal rating therefor; the provision of a coupling of the class described which may advantageously be constructed in the so-called double-support form; the provision of apparatus of this class having a minimum number of field coils each of which is advantageously stationary; and the provision of a form of coupling of this class which, if desired, by reversal of certain excitation may have its polarization conveniently changed, with resulting change in its torque-slip characteristics. Other objects and features will be in part apparent and in part pointed out hereinafter.

The invention accordingly comprises the elements and combinations of elements, features of construction, and arrangements of parts which will be exemplified in the constructions hereinafter described, and the scope of which will be indicated in the following claims.

In the accompanying drawings, in which several of various possible embodiments of the invention are illustrated, FIG. 1 is an axial section of an eddy-current coupling made according to one form of the invention;

FIG. 6 is a fragmentary diagrammatic view illustrating another alternative form of the invention;

FIG. 7 is a developed view of the surface of the rotor of the FIG. 6 form, being viewed on line 7—7 of that figure;

FIG. 9 is a diagram illustrating certain torque-slip characteristics discussed below.

Corresponding reference characters indicate corresponding parts throughout the several views of the drawings.

Eddy-current couplings of the type concerned herein are in general provided with one or more annular field coils generating one or more toroidal flux fields, the coils being arranged to send these fields through a magnetizable inductor drum. The drum, which is rotary, may be attached to either a driving or a driven shaft. The resulting toroidal field is polarized by means of a rotor assembly having poles formed by magnetizable teeth, the rotor assembly being attached to the driven or driving shaft, as the case may be.

The polarizing teeth are arranged in belts of the same around the rotor and have heretofore been made of two different forms. In one form the teeth in a given belt are in sequence all of one polarity, either north or south. Such teeth (or the like) will hereinafter be referred to, insofar as a given belt of the same is concerned, as noninterdigitating teeth or poles. In another form the polarizing teeth in a given belt are interdigitated and in sequence are alternately of reverse north and south polarities. These will hereinafter be referred to, insofar as a given belt of the same is concerned, as interdigitating teeth or poles.

The torque-slip curves produced by noninterdigitated poles are different from those produced by interdigitating poles, as may be seen from FIG. 9, which will be discussed more particularly below. Neither of the actions of interdigitated or noninterdigitated teeth (each taken alone) is ideal but a composite of their actions is advantageous. However, it has been difficult to arrange for a composite of their actions in eddy-current couplings of the class herein referred to.

Figure 1:
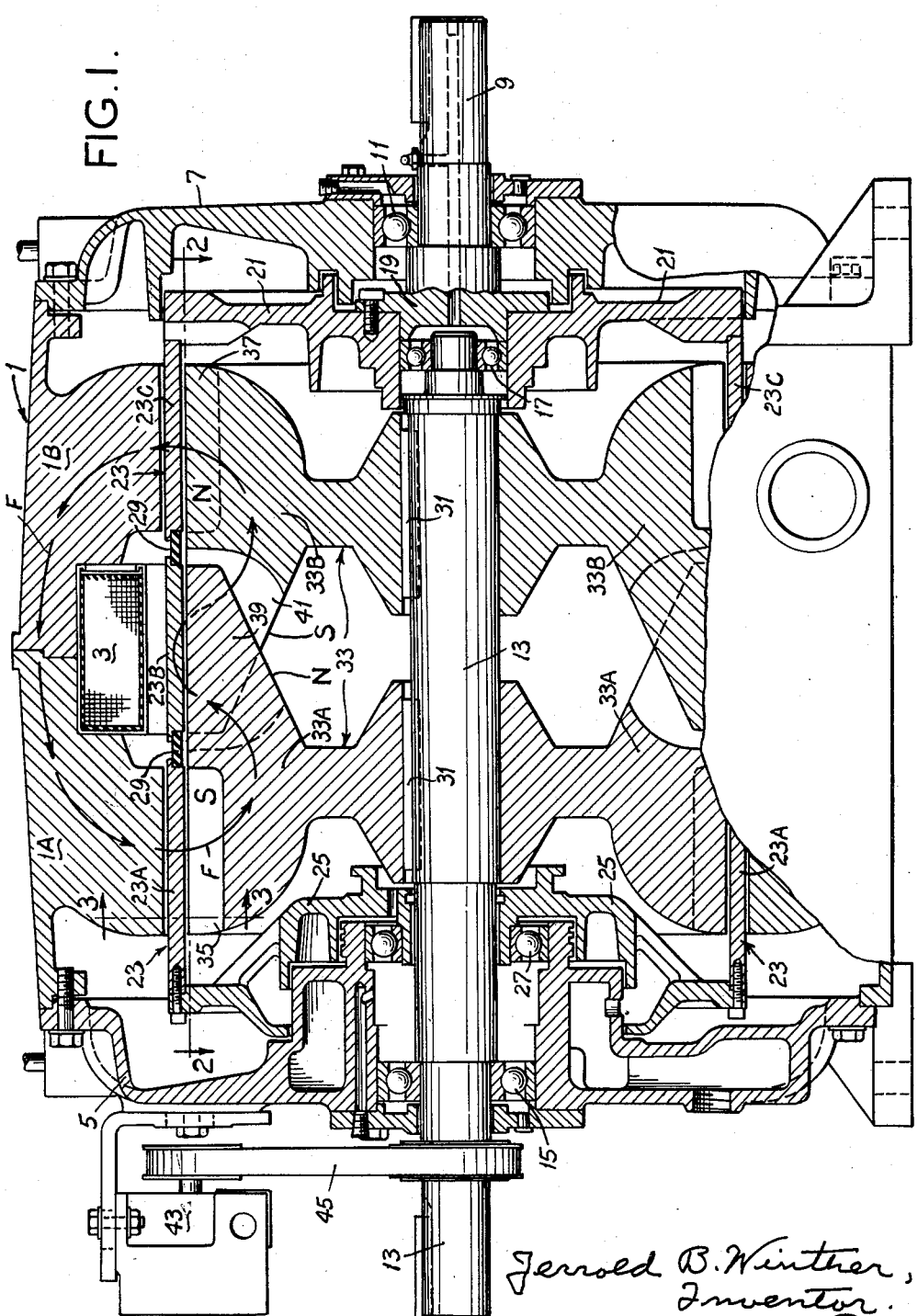

Referring now more particularly to FIG. 1, showing the one form of the invention, numeral 1 indicates a stationary magnetizable housing forming part of a field generating assembly consisting of parts 1A and 1B enveloping a stationary annular coil means 3. End bell members 5 and 7 enclose the assembly 1. A shaft 9, which may be the drive shaft, is supported in a bearing 11 in bell member 7. A shaft 13, which may be the driven shaft, is supported in a bearing 15 in bell member 5. Shaft alignment is maintained by a pilot bearing 17 between the inner shaft ends.

The inner end of shaft 9 is formed as a hub 19 to which is bolted a supporting spider 21 for one end of a magnetizable eddy-current or inductor drum or ring assembly 23. The other end of the drum assembly 23 is supported by a spider 25 carried in a bearing 27 in the end bell 5. Thus the drum assembly 23 is doubly centrally supported at its ends adjacent the end bells 5 and 7. The drum assembly 23 is composed of three magnetizable operative portions or segments 23A, 23B and 23C. The segments are connected by nonmagnetic rings 29. The purposes of these is to divide the drum 23 magnetically. Other means might be employed for this purpose, such as wall-thinning grooves. In some instances division is not required, since the drum inherently has three corresponding operative portions, as will appear. Keyed to the shaft 13, by keys 31, is a double-component pole assembly 33 consisting of left- and right-hand magnetizable rotor components 33A and 33B. On its left-hand side, rotor component 33A is formed with a belt of noninterdigitated poles 35 (see also FIG. 2) which may be south poles, as indicated. The south (or north) polarity depends upon the current direction in coil 3. These south poles lie within the drum ring portion 23A. On its right-hand side, rotor component 33B is formed with a belt of noninterdigitated poles 37 of north polarity. These north poles lie within the drum ring portion 23C. Extending from the right side of rotor component 33A is a belt of north poles 39 which interdigitate with a belt of south poles 41 extending oppositely from the left-hand side of rotor component 33B. The belts of interdigitated north and south poles 39 and 41 lie within the ring portion 23B. Suitable gaps are left between the drum assembly 23 and the housing assembly 1 on the one hand, and with the rotor assembly 33 on the other hand.

The field coil 3 is exited through connections with a suitable exciter circuit. This circuit may be automatically regulated by a tachometer generator 43, having a driving connection 45 with shaft 13. The excitation and control connections, being well known in the art, are not illustrated. It suffices to say that when coil 3 is excited, a toridal flux field such as shown, for example, by darts F will be generated around it. This field is of toroidal shape around the annular coil 3 and loops through housing member 1A, drum portion 23A, noninterdigitating poles 35 (making them of south polarity, for example), interdigitating poles 39 (making them of north polarity), drum portion 23B, interdigitating poles 41 (making them of south polarity), noninterdigitating poles 37 (making them of north polarity), drum portion 23A, housing segment 1B, thus returning to segment 1A. Upon rotation of shaft 9 from a suitable power source, shaft 13 will be driven because of the resulting reactive coupling between the drum assembly 23 (connected to shaft 9) and the rotor assembly 33 (connected to shaft 13). The coupling occurs because eddy currents are generated in the inductor drum 23. These induce a magnetic field which reacts with the field poles formed by the teeth 35, 37, 39 and 41.

The amount of rotary slip (so-called) between the speeds of shafts 9 and 13 will depend upon the resisting torque on shaft 13 and intensity of the field F, the latter being determined by the current flowing through coil 3. For greater current and/or less torque there is less slip, and for less current and/or greater torque there is more slip. For a machine made according to the invention, the torque transmitted for various slip speeds is characterized by curve 47 in FIG. 9, due to the action of noninterdigitated poles 35, 37, and of the interdigitated poles 39 and 41. FIG. 9 also shows by curve 49 what the character of the action would be if the effects of the interdigitated poles 39 and 41 were to be omitted. It also shows by curve 51 what the character of the action would be if the noninterdigitated poles 35 and 37 were to be omitted. The characteristic action illustrated by curve 47 is advantageous because on the one hand it provides a fairly rapid rise in torque with increased slip, which is superior to that indicated by curve 49, and on the other hand torque is maintained at a more constant value at higher slip speeds than indicated by curve 51.

Figure 2:
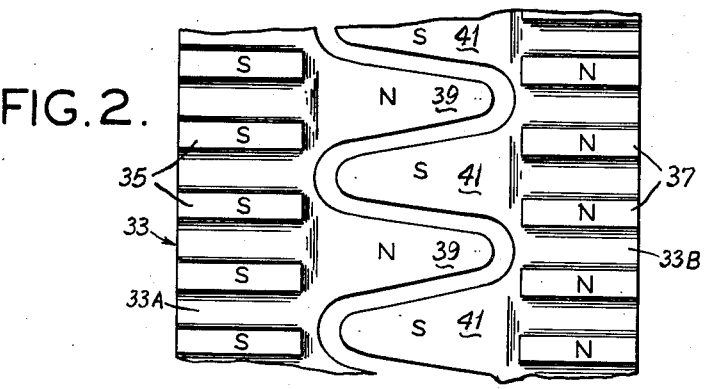
FIG. 2 is a developed view on a reduced scale of the rotor surface as viewed from line 2—2 on FIG. 1.
Figure 3:
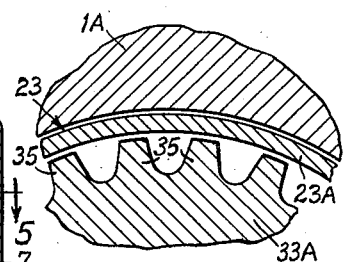
FIG. 3 is a fragmentary cross section taken on line 3—3 of FIG. 1.
Figure 4:
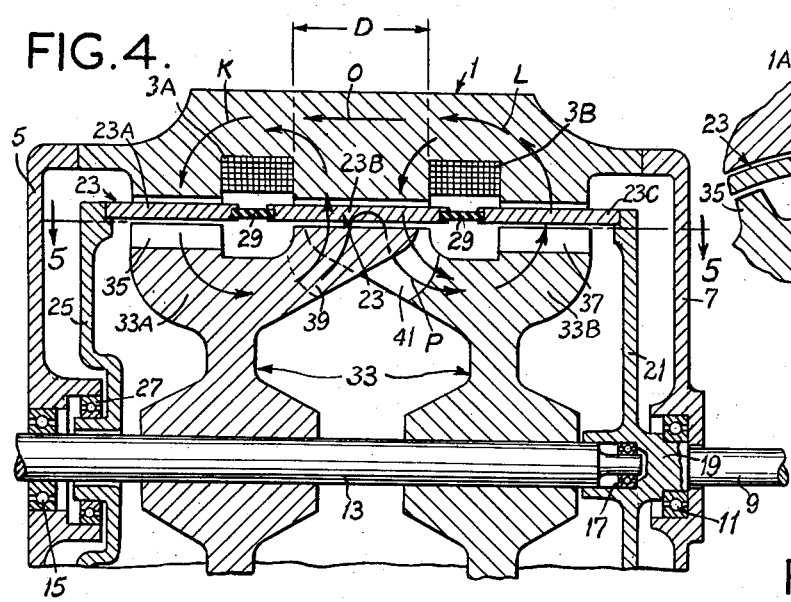
FIG. 4 is a diagrammatic fragmentary view illustrating an alternative form of the invention.
Figure 5:
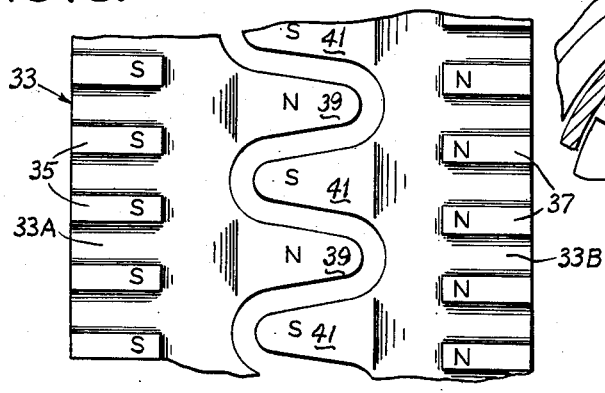
FIG. 5 is a developed view of the surface of the rotor of the FIG. 4 form, being viewed on line 5—5 of that figure.

In FIGS. 4 and 5 is diagrammatically shown a modification of the form of the invention shown in FIGS. 1–3. These figures omit some details for simplicity, but otherwise like numerals designate like functioning parts. In this case, two exciter coils 3A and 3B are employed as coil means in the housing assembly 1. Each of these is located between drum segments, that is, each surrounds a nonmagnetic ring 29. When the coils 3A and 3B are excited by current flowing through them in the same circular directions (viewed axially), magnetic loops will tend to form as indicated by the darts K and L. Some flux, as indicated by dart O, will tend to form a loop about both coils, the other part required to complete this loop being illustrated by dart P which passes from poles 39 to poles 41 via drum segment 23B. Thus the driving action in regions flanking the outsides of coils 3A and 3B, taken as a pair, caused by the noninterdigitating poles 35 and 37, will be characterized by a curve such as 49 (FIG. 9); the driving action between the coils 3A and 3B, due to the interdigitated poles 39 and 41, will be characterized by a curve such as 51; and their composite action will be characterized by a curve such as 47.

In building a machine according to FIGS. 4 and 5, an adequate distance D needs to be provided between the coils 3A and 3B. This distance should not be so small that bucking action at adjacent parts of the loops K and L between coils 3A and 3B will extend into the drum ring portion 23B. Such bucking action in that portion 23B tends to cancel the driving action expected from interdigitating poles 39 and 41. Thus the distance D should be made sufficient that such cancellation will not occur to any great extent. The exact distance varies according to each size of machine and shapes of its parts, such as housing, drum and rotor elements, as well as the magnetomotive force of its coils. It is noteworthy that the requirement for an adequate distance D makes the double-support type of the machine as described a very useful form, that is, one in which the drum assembly 23 is doubly supported at opposite substantially spaced ends.

Figure 8:
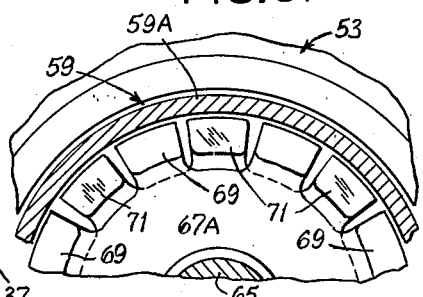
FIG. 8 is a fragmentary cross section taken on line 8—8 of FIG. 6.

In FIGS. 6–8 is diagrammatically shown another double-coil form of the invention. In this form the magnetizable housing is generally numbered 53 and carries two coils 55 and 57 surrounding inductor drum assembly 59, composed of three magnetizable ring portions 59A, 59B and 59C. The latter are carried on members 61 and 63 and correspond to the spider members 21 and 25 in FIG. 1. The rings are joined by nonmagnetic rings 60. Keyed to driven shaft 65 (corresponding to shaft 13 in FIG. 1) is a rotary assembly 67. This consists of rotors 67A and 67B, carrying peripherally disposed poles 69 and 71, respectively.

As shown in FIG. 7, each pole 69 and 71 is straight and extends axially across its respective rotor 67A or 67B, as the case may be. Central interdigitation of these poles occurs in the overlap region R. This arrangement differs from the pole forms of FIGS. 2 and 5, in that overlap (which provides interdigitated pole portions) is effected simply by extensions of the noninterdigitating pole portions. In the forms of FIGS. 1–5, a noninterdigitating pole is different in shape from an interdigitating pole. Moreover, the interdigitating and noninterdigitating poles are offset. Assuming as regards FIG. 6 that the current in annular coils 55 and 57 flows in the same circular direction, the toroidal magnetic field will appear as shown by the solid-line darts U and the polarizations in teeth 69 and 71 will appear as shown by solid letters N and S to indicate north and south poles, respectively. The torque-slip relationship will be characterized by a curve such as 47 in FIG. 9.

A feature common to both forms of the invention shown in FIGS. 4 and 6 is the effect of reversing the flow of current in one of the annular coils with respect to the direction of current flowing in the other. For example (in FIG. 6), consider a reversal of current in coil 57 so as to flow oppositely to that in coil 55. This will set up a magnetic field, as illustrated by the dotted darts Y. In considering the dotted darts Y, the solid darts U are to be ignored. Then there will be no bucking action between the toroidal loops in the space between the two coils 55, 57. As a consequence, the north-south polarities of teeth 69 and 71 will appear as shown by the dotted letters N and S on FIG. 7. In other words, the alternating polarities (N, S, N, S, etc.) of the parts of the teeth 69 and 71 in the region R do not occur, being simply repetitive (N, N, N, etc., for example), so that the machine as a whole operates somewhat more closely along the lines of curve 49, illustrated in FIG. 9. Obviously, from the above, the form of the invention shown in FIGS. 4 and 5 may likewise be operated. Thus the forms of the invention shown in FIGS. 4–7 have the advantage that simply by reversing the flow of current in one of the two coils relative to that in the other, the operating characteristics of the coupling may be changed from the characteristic of curve 47 to that of curve 49, should this for any reason become desirable. As between the forms of the invention shown in FIGS. 4 and 6, the latter is somewhat simpler to construct.

It will be observed that in all forms of the invention the interdigitating parts of the poles lie within the central ring segment of the inductor. However, in the FIG.

6 form noninterdigitating pole portions extend across two of the ring segments, which is not the case in the FIG. 1 form.

While the invention has been described as being applicable to eddy-current couplings in which both driving and driven members rotate, it is applicable to analogous machines such as brakes and dynamometers which are also in effect couplings and wherein, beside the field generating assembly, one of the relatively rotary inductor and pole members is stationary, so that the device can serve as a brake. The term eddy-current coupling is intended to apply to all of such structures.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. An eddy-current coupling comprising a circular stationary flux field assembly including annular coil means adapted to form at least one toroidal flux field, a circular double-component pole assembly, a circular eddy-current inductor assembly located between said field and pole assemblies, said inductor assembly comprising three adjacent ring portions, said flux field interlinking the field, inductor and pole assemblies, said inductor and pole assemblies being relatively rotary, the extreme operative ring portions of the inductor assembly being located on opposed sides of said coil means, the other ring portion being positioned intermediately between the extreme ring portions, said pole assembly having three adjacent bands of magnetic poles, the extreme two bands of which are located adjacent the extreme inductor ring portions respectively, all polarities of each extreme band being the same but those of each of said extreme bands being opposite those of the other, the third and intermediate band of poles being of alternately opposite polarities located adjacent the intermediate inductor ring portion.

2. An eddy-current coupling according to claim 1, wherein said poles are formed by teeth on the pole assembly, the teeth forming said extreme bands being noninterdigitated and those forming the intermediate band being interdigitated.

3. An eddy-current coupling according to claim 1, wherein said field, inductor and pole assemblies are cylindrically formed around a common axis.

4. An eddy-current coupling according to claim 3, wherein the inductor assembly is within the field assembly and the pole assembly is within the inductor assembly.

5. An eddy-current coupling according to claim 4, wherein the inductor assembly has two rotary supports located at opposite ends of the pole assembly therein.

6. An eddy-current coupling comprising a stationary cylindrical magnetizable field assembly, annular coil means affixed in said field assembly adapted to form at least one toroidal flux field, a magnetizable cylindrical double-section pole assembly, a cylindrical triple-ring magnetizable inductor assembly, said inductor and pole assemblies being relatively rotatable, the outer two rings flanking said coil means and the third ring being positioned intermediately, said pole assembly being formed with three adjacent bands of pole-forming teeth the extreme bands of which extend from and are in noninterdigitated sequences on the pole assembly sections respectively, the other intermediate band of which lies adjacent the intermediate ring portion and is constituted by sets of teeth extending from the pole assembly sections respectively in an interdigitated sequence.

7. An eddy-current coupling according to claim 6, wherein said coil means is constituted by a single coil.

8. An eddy-current coupling according to claim 6, wherein said coil means is constituted by spaced coils flanking the interdigitated sequence of teeth.

9. An eddy-current coupling according to claim 8, including rotary supports for the inductor assembly located at opposite ends of the pole assembly.

10. An eddy-current coupling comprising a cylindrical stationary flux field assembly including at least one annular coil means adapted to form a toroidal flux field, an eddy-current inductor drum within the field assembly, a cylindrically formed pole assembly within the inductor drum, said flux field interlinking said pole assembly and inductor drum, said inductor drum and pole assembly being relatively rotary, the pole assembly having two toothed sections, the extremes of said inductor drum flanking the coil means, the teeth of said toothed sections having groups thereof flanking the coil means and composed of noninterdigitating teeth lying within said extremes respectively of the inductor drum, other groups of teeth of the respective toothed sections lying intermediately and being interdigitated.

11. An eddy-current coupling comprising a cylindrical stationary flux field assembly including annular coil means adapted to form a toroidal flux field, an eddy-current inductor drum within the field assembly having extreme portions flanking the coil means and an intermediate portion, a cylindrically formed pole assembly within the inductor drum, said flux field interlinking said pole assembly and inductor drum, said inductor drum and pole assembly being relatively rotary, the pole assembly having two toothed sections each section carrying a pair of tooth bands, one band of each pair lying within the extremes of the drum and flanking said coil means and having noninterdigitated teeth, the other band of each pair lying within an intermediate portion of the drum, the teeth of the last-named bands being interdigitated.

12. An eddy-current coupling according to claim 11, wherein the members of each pair of bands are collinear.

13. An eddy-current coupling according to claim 11, wherein the members of each pair of bands are staggered.

14. An eddy-current coupling according to claim 11, wherein the coil means is constituted by a single annular coil.

15. An eddy-current coupling according to claim 11, wherein the coil means is constituted by a pair of spaced annular coils.

16. An eddy-current coupling according to claim 15, wherein said coils are adapted to carry current in the same or opposite circular directions.

17. An eddy-current coupling comprising a cylindrical stationary flux field assembly including an annular coil adapted to form a toroidal flux field, an eddy-current inductor drum within the field assembly having extreme portions flanking the coil and an intermediate portion therein, a cylindrically formed pole assembly within the inductor drum, said flux field interlinking said pole assembly and inductor drum, said inductor drum and pole assembly being relatively rotary about a common axis, the pole assembly having two toothed sections, each section having a band of noninterdigitated teeth lying within the extremes of the drum and flanking said coil, the teeth of each band being noninterdigitated, each section also having a band of teeth lying within said intermediate portion of the drum and within the coil, the members of each of said last-named bands being interdigitated in an axial direction.

18. An eddy-current coupling according to claim 17, wherein the interdigitating teeth and the noninterdigitated teeth of each section are staggered.

19. An eddy-current coupling comprising a cylindrical stationary flux field assembly including a pair of spaced annular coils adapted to form a toroidal flux field, an eddy-current inductor drum within the field assembly having extreme portions flanking the coils and an intermediate portion therebetween, a cylindrically formed pole assembly within the inductor drum, said flux field interlinking said pole assembly and inductor drum, said inductor drum and pole assembly being relatively rotary about a common axis, the pole assembly having two toothed sections, each section having a band of noninterdigitated teeth lying within the extremes of the drum and flanking said coils and another band of teeth lying within the intermediate portion of the drum and between the coils, the members of each of said last-named bands being interdigitated in an axial direction.

20. An eddy-current coupling according to claim 19, wherein the noninterdigitated teeth and the interdigitating teeth of each section are collinear.

References Cited in the file of this patent

UNITED STATES PATENTS

| | | |
|---|---|---|
| 2,617,053 | Winther | Nov. 4, 1952 |
| 3,054,007 | Munson | Sept. 11, 1962 |